Aug. 31, 1954

J. B. McFALL 2,687,754

EDGE-JOINTING AND BONDING MACHINE

Filed Jan. 2, 1951

INVENTOR.
JOE B. McFALL
BY
Reynolds, Beach & Christensen
ATTORNEYS

Aug. 31, 1954

J. B. McFALL 2,687,754

EDGE-JOINTING AND BONDING MACHINE

Filed Jan. 2, 1951

INVENTOR.
JOE B. McFALL
BY
Reynolds, Beach & Christensen
ATTORNEYS

Aug. 31, 1954  J. B. McFALL  2,687,754
EDGE-JOINTING AND BONDING MACHINE
Filed Jan. 2, 1951  4 Sheets-Sheet 3
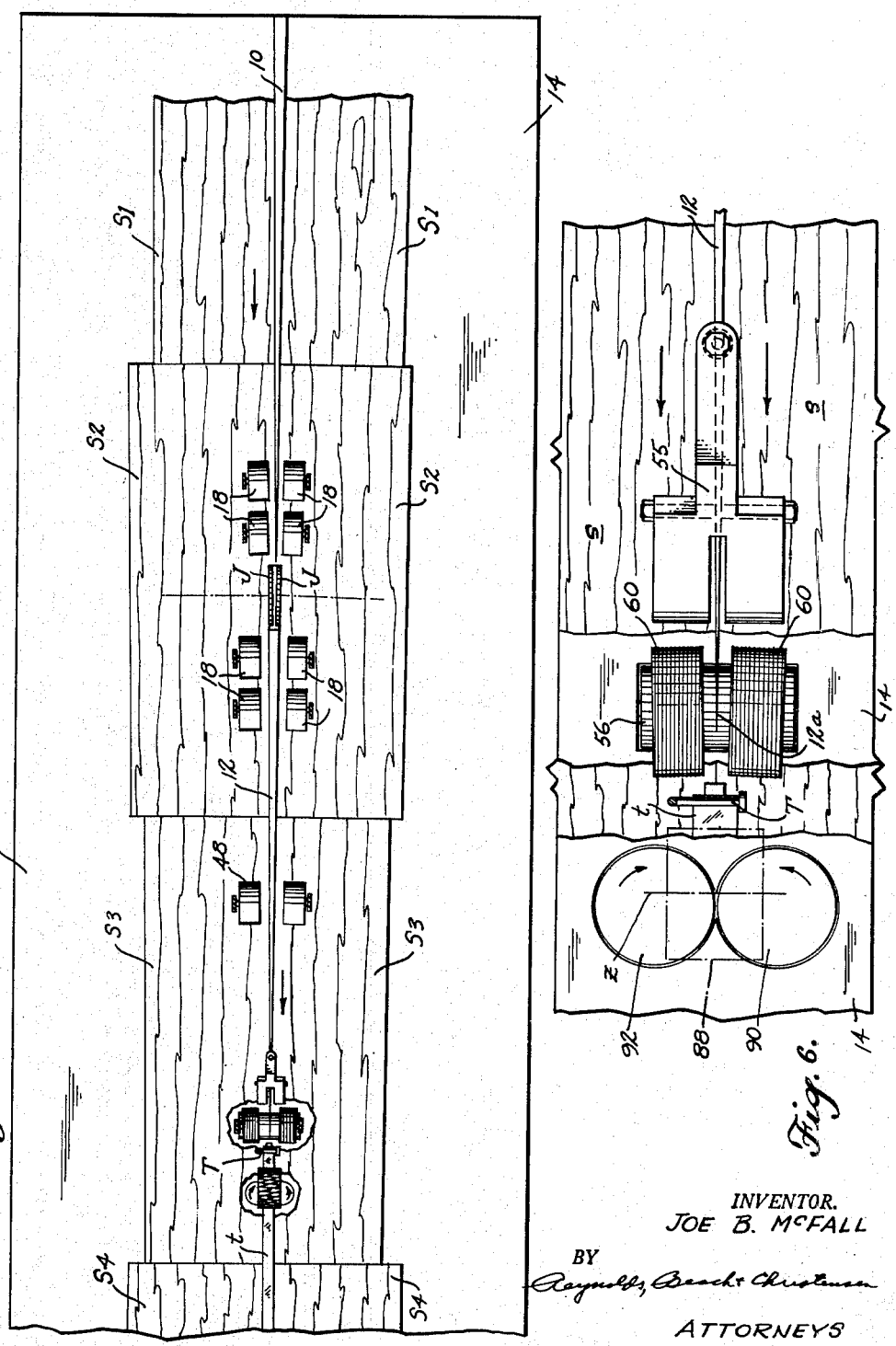
INVENTOR.
JOE B. McFALL
BY
*Reynolds, Beach & Christensen*
ATTORNEYS Aug. 31, 1954
J. B. McFALL
2,687,754
EDGE-JOINTING AND BONDING MACHINE
Filed Jan. 2, 1951
4 Sheets-Sheet 4
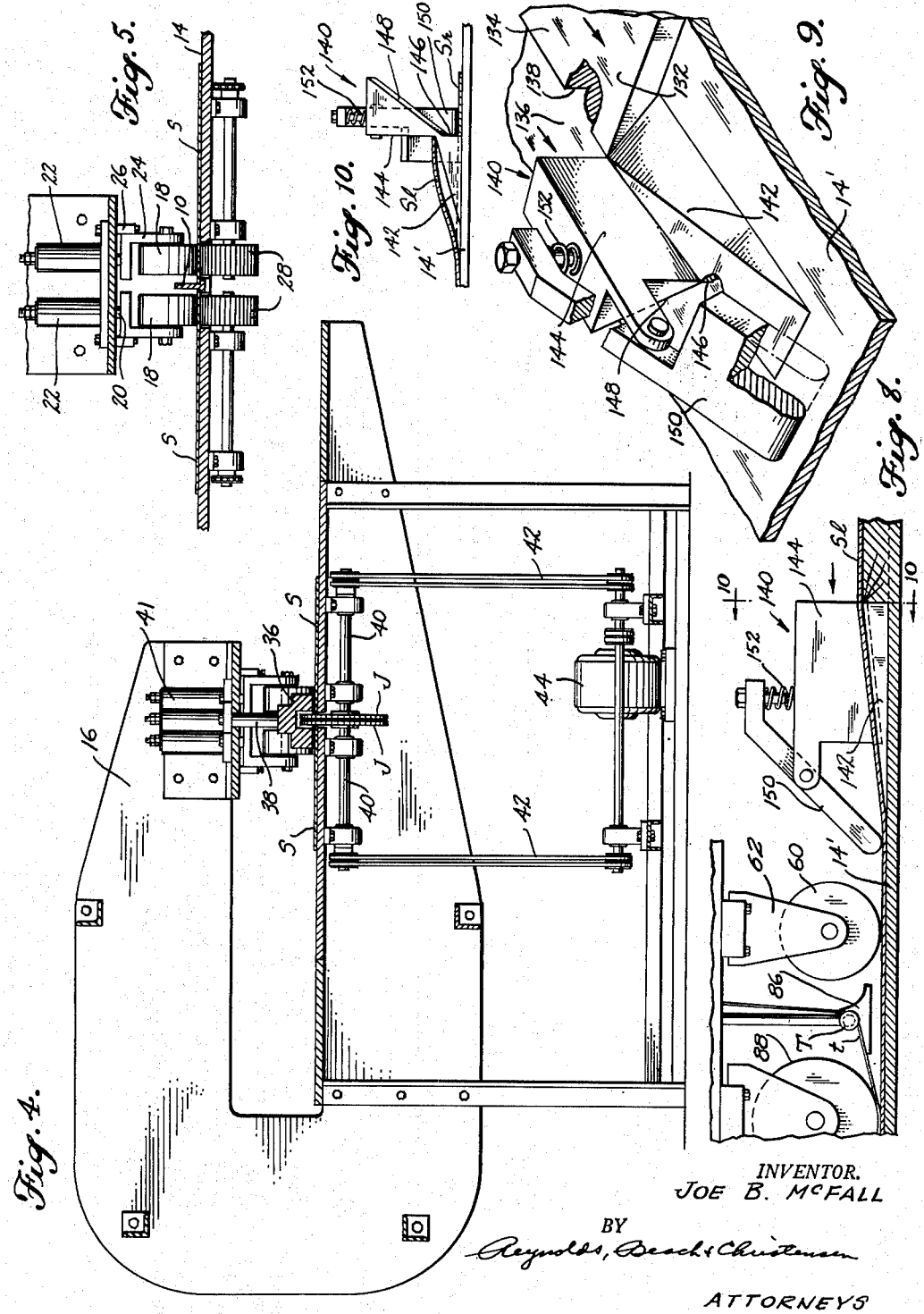
INVENTOR.
JOE B. McFALL
BY
Reynolds, Beach & Christensen
ATTORNEYS Patented Aug. 31, 1954

2,687,754

UNITED STATES PATENT OFFICE 2,687,754

EDGE-JOINTING AND BONDING MACHINE

Joe B. McFall, Seattle, Wash., assignor to United States Plywood Corporation, Seattle, Wash., a corporation of New York Application January 2, 1951, Serial No. 204,024

2 Claims. (Cl. 144—279)

This invention relates to apparatus for jointing and edge-joining material strips and is primarily concerned with the fabrication of plywood veneer sheets from narrower strips jointed and taped or edge-glued together. Veneer sheets formed in this manner are commonly used as the surface layers in plywood, the tape being removed when the completed plywood is being trimmed and finished.

Because veneer strips when dried are warped, and are long and unwieldly, the problem of jointing and taping or gluing them together to form a uniform close-fitting joint involves accurately jointing the edges of the strips while a portion of substantial width back from the edges is in flattened condition, and subsequently holding flattened such edge portions of adjacent sheets with the sheet edges abutted firmly as the tape is being applied or glue set along the joint. In addition it is desirable, of course, that these operations be executed at maximum production rate and with minimum handling of the strips. To promote accuracy of joining it is a principal object to match in the finished joint the edge portions of two sheets jointed simultaneously, which can best be accomplished by jointing the strip edges, abutting them and taping them together in immediate production line sequence. Low cost, reliable operation and easy maintenance of the equipment utilized are additional objects.

In accordance with the invention, the novel apparatus comprises strip-feeding and guiding means cooperating with the jointing and bonding units for jointing and joining automatically veneer strips of a pair in a continuous operation. Thus pairs of strips may be presented to the machine in endless succession. More specifically features of the invention reside in the novel subcombination comprising the special arrangement of tapered guides, preferably in the form of barrier rails aligned with jointer heads and cooperating with strip feeding and holding means. Additional features reside in the novel subcombination comprising strip feeding and holding mechanism including a hold-down roll cooperating with oppositely rotating strip-supporting platform rolls which crowd the strips together while advancing them beyond the tapered guides.

A pair of veneer strips to be jointed and bonded together are initially placed abreast of each other on opposite sides of a tapered strip separating guide rail and advanced in unison along opposite sides of such rail in the direction of taper thereof to a jointer head including a pair of jointing cutters generally aligned with the rail and rotating, respectively, in inclined planes parallel to corresponding sides of such rail. The jointed strip edges then slide along opposite sides of a second tapered guide rail aligned with the first rail and extending to an apex. As the strips move beyond this second rail their edges are urged together progressively as the strips continue to advance.

With their edges pressed firmly into abutment the edge portions of the strips then pass over a pair of strip-supporting platform rolls arranged adjacent to each other on opposite sides of the strip joint line and rotated synchronously in opposite directions, beneath a hold-down roll. The platform rolls are independently mounted and urged upwardly into contact with the strip marginal portions by yieldable resilient means. These rolls are rotated in opposite directions such that pressure of the hold-down roll applied along a transverse line offset toward their feed side from the vertical plane containing the platform roll axes subjects the strips to components of friction force produced by the platform rolls urging the strips mutually together and in the direction of feed. Any slight differences or variations in strip thickness are accommodated, without disturbing operation of these rolls, by yielding of the separate springs urging them into engagement with the strips.

These and other features, objects and advantages of the invention, including certain details of its preferred and herein illustrated forms, will now become more fully evident from the following description based on the accompanying drawings.

Figure 1 is a side elevation of the jointing section of the machine, while

Figure 3 is a horizontal transverse section, on a smaller scale, of the complete machine taken on section lines 3—3 in Figures 1 and 2.

Figure 4 is a transverse vertical section taken on line 4—4 in Figure 1.

Figure 5 is a transverse vertical section taken on line 5—5 in Figure 1.

Figure 6 is a transverse horizontal section taken on line 6—6 in Figure 7.

Figure 8 is a side elevation view of a portion of the taping apparatus and modified strip guide means employed in conjunction therewith when the strips are to be fed manually to such apparatus.

Figure 9 is a perspective view of such guide means, and Figure 10 is an end elevation view of the same.

Different successive stages or transitory positions of the strips during their advance through the machine are illustrated in Figure 3. In this figure the veneer strips S1 of the first pair are initially positioned abreast on opposite sides of the first tapered guide rail 10, either manually or by suitable mechanical means (not shown), to advance along converging paths defined by the opposite sides of the guide rail. The immediately preceding pair of strips S2 has advanced to an intermediate stage in the jointing operation being effected by the jointing heads J incorporating cutters which trim off and hog marginal excess material as the strips advance past them. It will be noted that the jointed edges of strips S2 extend part way along the second tapered guide rail 12, aligned with the first guide rail 10 as shown, without deflecting the strips. The pair of strips S3 ahead of the strips S2 have advanced partly beyond the apex of guide rail 12 for progressive application of tape $t$ by the taping device T. The next preceding pair of strips S4, ahead of the strips S3, have been completely taped together as shown. It will be apparent that the tape is subsequently torn or cut between composite sheets emerging from the machine so that the sheets may be handled separately thereafter.

Figure 1:
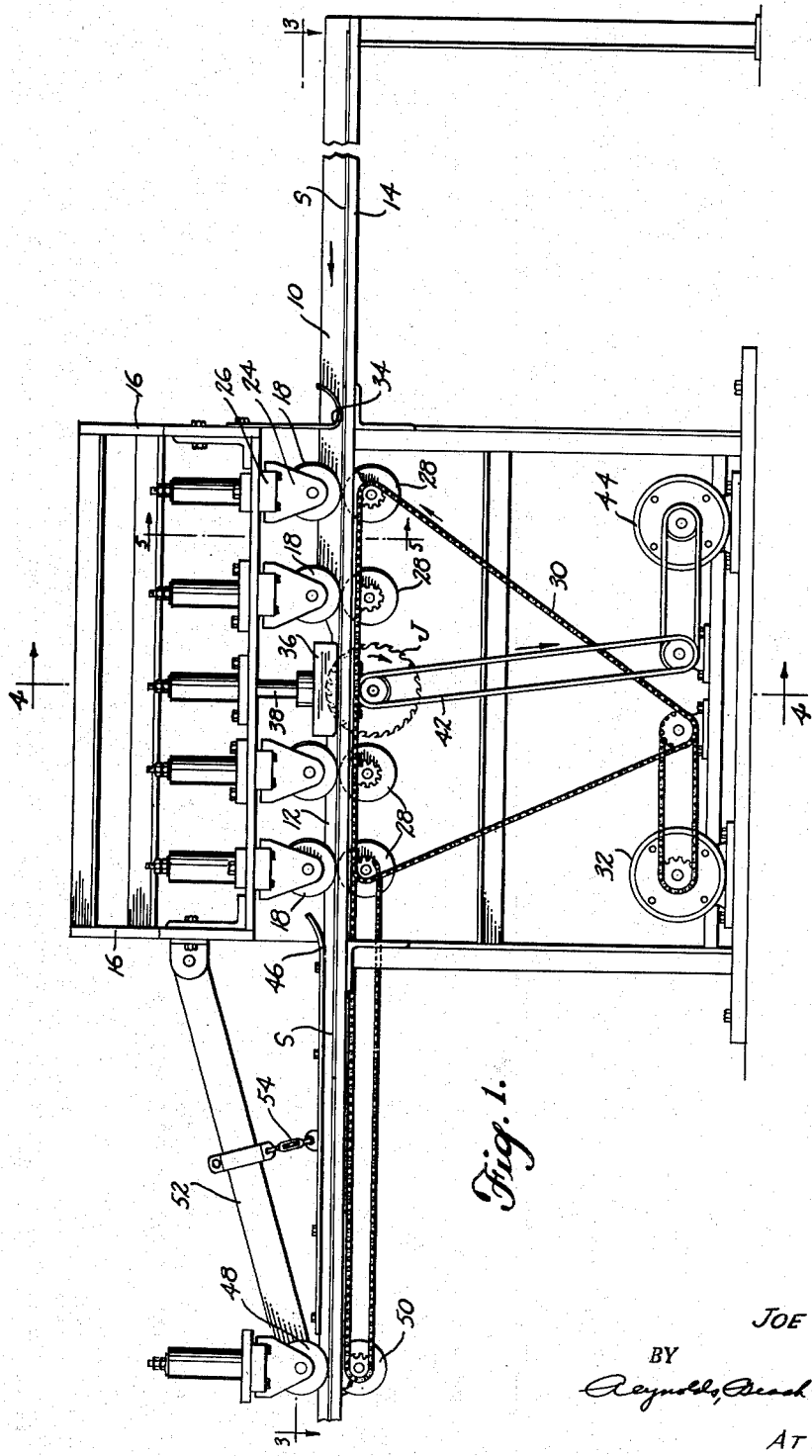
Figure 2:
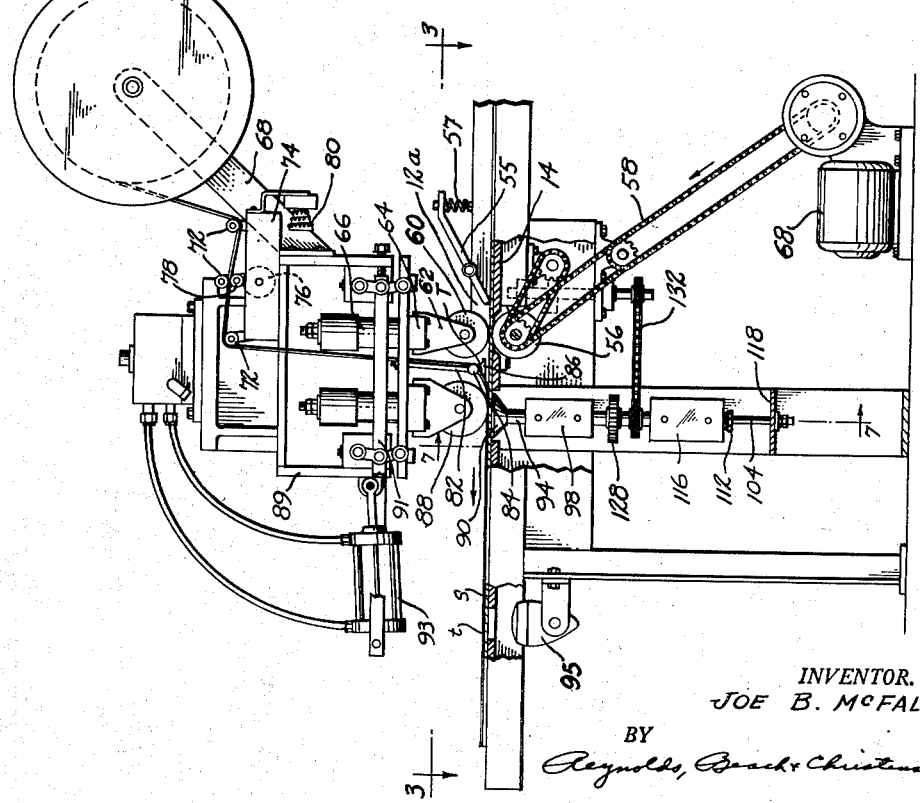
Figure 2 is a side elevation of the edge-joining or bonding section thereof, presented as a continuation from the left end of the showing in Figure 1.

As shown in Figures 1 and 2, the machine frame carries an elongated strip-supporting feed table 14 along the center line of which the different operating units and tapered barrier rails 10 and 12 are successively located. Upon a frame superstructure 16 are mounted the supports for pairs of upwardly yieldable, downwardly urged holddown rolls 18 arranged in series on opposite sides of the center line of the support. Such hold-down rolls press the veneer strips firmly against underlying powered rolls 28 mounted in openings in the feed table surface. Reciprocable roll supporting post 20 (Figure 5) are slidably received in cylindrical housings 22 containing suitable springs (not shown), which urge such suporting posts downwardly. Angle roll supports 24 carried by such posts have vertical sides which slide up and down along fixed guide bars 26 as a strip of veneer is moved beneath rolls 18 or the thickness of such strips vary. Such bars maintain the axes of the respective rolls at all times substantially perpendicular to the adjacent sides of the tapered guide rails 10 and 12, as shown in Figure 3.

Preferably the driven feed rolls 28 have longitudinal serrations (Figure 5) to increase their traction on the strips, and the inclination of their rotative axes relative to the longitudinal center line of the feed table 14 is such that the strip edges are maintained slidably in contact with the central guide rails 10 and 12 as the strips advance. The driven rolls 28 at opposite sides of the table are shown driven by separate chain and sprocket drive means 30 connected to a common power source, such as electric motor 32.

As a pair of strips, such as the strips S1, approach the jointer heads J along tapered barrier 10, they first encounter the upcurved guard 34 which guides their leading edges beneath the first set of hold-down rolls 18. Thereupon the strips are mechanically advanced by rotation of the underlying serrated drive rolls 28, thence to the second set of hold-down rolls and drive rolls. After passing through two such sets of hold-down and drive rolls, the leading edges of the strips pass beneath the receiving end of the holddown shoe 36, the bottom of which is recessed to receive the upper peripheries of the high speed jointer heads J (Figure 1). The cross-sectional shape of the hold-down shoe 36 appears more clearly in Figure 4, such shoe being supported by a post 38 slidably received in a cylindrical support 41 and spring-urged downwardly against the veneer strips in the same manner as the holddown roll supports previously described.

The jointer heads J are supported on separate arbors 40 to rotate in planes respectively parallel to the corresponding adjacent sides of the tapered guide barrier 10. The sides of guide rail 12 converge at precisely the same angle as the sides of guide rail 10 and the outer sides of the cutter heads J. Also the thickness of the feed end of rail 12 is selected, taking into account its position along the feed table with respect to the jointer heads, such that the sides of rail 12 are coplanar, respectively, with the outer sides of the cutter heads J. The jointed edges of the strips are thus exactly aligned with the sides of tapered guide rail 12. The arbors 40 are driven through belting 42 from a common source of power such as electric motor 44. These jointing cutters not only trim the veneer edges but hog the marginal excess material from the strips S advancing beneath the hold-down shoe 36. Thus a smoothly jointed edge is found on each such strip and the trimmings are disposed of readily in the form of sawdust. It will be seen that the steady guidance afforded the strips, first by guide rail 10, and then by the rails 10 and 12 together, results in an accurately jointed edge on each such strip, and any slight variation in such edges is unobjectionable because corresponding variations would occur on both sheets. Each variation would be matched to the corresponding variation on the jointed edges of its mate to form a perfect joint.

After leaving the jointer heads J the strips pass successively between additional pairs of holddown rolls 18, and cooperating feed rolls 28, thence slidably beneath the fixed hold-down plates 46 at each side of guide rail 12, and finally beneath the arm-supported hold-down rolls 48 cooperating with the driven rolls 50 as shown in Figure 1. The rolls 48 are spring-urged against the strips in the manner of hold-down rolls 18, the supports for the rolls 48 being carried by the arm 52 which is normally held in fixed relation to the supporting table 14 by a turnbuckle 54 as shown, but can be swung upward clear of the feed table when desired by releasing the turnbuckle.

The second tapered guide rail 12 terminates in an apex 12a (Figure 2) which preferably is quite sharply pointed (Figure 6) so that the jointed strip edges merge in contacting relationship substantially at the apex of this guide rail. A bifurcated hold-down arm 55 is pivoted about a transverse horizontal axis between its ends at the upper portion of guide rail 12 near the latter's apex to hold the advancing strips down against the feed table 14. The arm is urged downwardly by the force of a spring 57.

A serrated strip-supporting feed roll 56 driven by chain and sprocket drive 58 from electric motor 68 is located at the apex of the guide rail 12 and engages the lower faces of the strips through a suitable opening in the feed table. The respective strips are pressed downwardly against such feed roll by circumferentially serrated hold-down rolls 60 carried by upwardly yieldable mountings including roll supports 62, orienting bars 64 and actuating spring housings 66, similar to the mounts 24, 26, and 22, respectively, for the hold-down rolls 18 previously described and best seen in Fig. 5.

The circumferentially serrated hold-down rolls 60 are oriented with their rotational axes substantially perpendicular to the adjacent sides of the tapered guide rail 12. As a result these rolls function as crowding rolls to prevent the jointed edges of the strips from springing apart and out of contact with the sides of guide rail 12 as a result of the mutual contact of such edges at a location beyond the apex end of such guide rail. No matter how gradual the taper of the guide rails 10 and 12 there is an inevitable impact between the strip edges because respective planes of the guide rail's opposite sides both form dihedral angles with the mutual plane of contact of the jointed strip edges beyond the apex formed by such sides. Consequently the jointed strip edges should be forced together immediately beyond the apex of guide rail 12, as by serrated rolls 60, and preferably also by special crowding and feeding mechanism comprising the platform rolls 90 and 92 as later described, instead of allowing a gap to be formed between them as they are bent into parallel relationship.

The contacting marginal edge portions of the advancing strips pass, from guide rail 12 and rolls 60, next beneath the edge-joining instrumentality, for example the tape guide T, for application of adhesive-coated bonding tape t. The taping mechanism may be of any suitable type, comprising in the illustrated case a supporting arm 68 for the drum 70, tape guide rolls 72, a tape adhesive-moistening unit including the water reservoir 74, water pickup roll 76, water transfer roll 78 applying the water to the tape, and the water heater element 80. A depending supporting arm 82 carries at its lower end a transverse guide roll 84 and underlying slide shoe 86 cooperating with the guide roll 84 to guide the tape with minimum resistance into the line of movement of the tape-receiving veneer strips passing beneath the shoe. Advance of the strips draws more tape from drum 70 as needed. The freshly moistened tape is pressed firmly against the edge-abutted strips by the hold-down roll 88 carried by a spring-actuating mount similar to those previously described.

The hold-down pressure of roll 88 against the tape and strips serves an additional purpose associated with the operation of platform rolls 90 and 92 located beneath such hold-down roll. The function of these platform rolls, having strip-engaging flat upper faces normally disposed slightly above the surface plane of feed table 14, is to supportingly engage the strip margins pressed downward by hold-down roll 88. In thus supporting the veneer strips these platform rolls urge their edges both together and in the direction of feed by frictional force applied to the lower surfaces of the strips. These platform rolls thereby insure that the strips will be fed without interruption as well as that their jointed edges will be pressed tightly together as the tape is being progressively applied.

Figure 7:
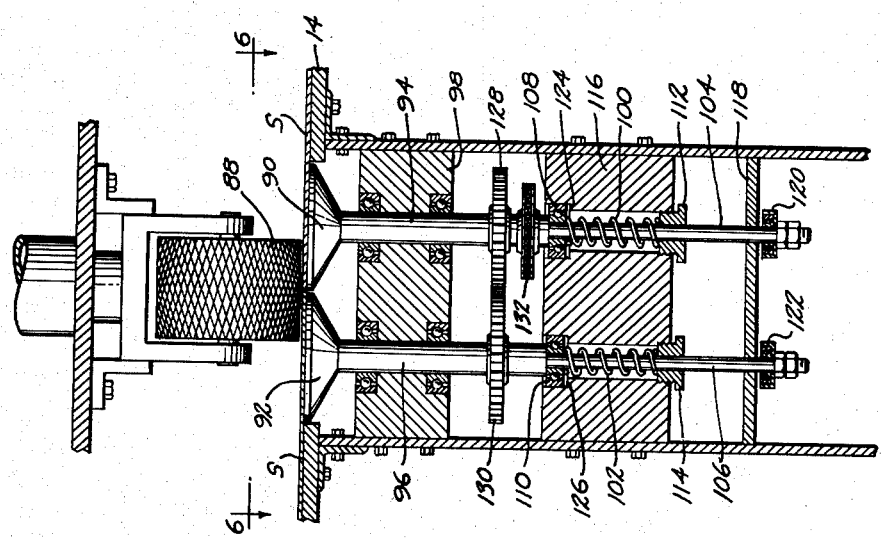
Figure 7 is a transverse vertical section taken on line 7—7 in Figure 2.

The platform rolls 90 and 92 are rotatively supported on vertical shafts 94 and 96, respectively, journaled in the stationary block 98, as shown best in Figure 7. The shafts are free to slide longitudinally in their respective journals to permit independent vertical shifting of the platform rolls. Springs 100 and 102 encircling the reduced-diameter downward extensions 104 and 106 of the respective shafts react upwardly against shoulders thereon through sliding bearings 108 and 110, respectively, as shown. The lower ends of the springs are supported by nuts 112 and 114 threaded into the lower ends of vertical bores in the guide block 116 which bores receive the springs and sliding bearings. The shaft extensions 104 and 106 pass slidably through apertures in the nuts 112 and 114 and downwardly through apertures in a stop plate 118.

Radial-and-thrust bearings 120 and 122 mounted upon the lower ends of the extensions 104 and 106 constitute stops engageable with the stop plate 118 to limit upward movement of the respective platform rolls 90 and 92 under the influence of springs 100 and 102. Downward movement of such platform rolls is limited by engagement of the slide bearings 108 and 110 with shoulders 124 and 126 in the respective bores receiving such slide bearings, as shown.

Pinion gears 128 and 130 suitably keyed upon the respective platform roll shafts 94 and 96 mesh together and, being of equal diameter, insure equal rates of rotation of the platform rolls in opposite directions when one of the shafts, such as the shaft 94, is being driven by a chain and sprocket drive 132. The pinion or spur gears 128 and 130 are free to slide relative to each other lengthwise of the platform roll shafts in order to accommodate relative vertical shifting of the platform rolls, as previously mentioned. Figure 2 illustrates the arrangement for driving the platform rolls from the electric motor 66 driving the feed roll 56, thereby insuring equal effective strip feed rates imparted respectively by the feed roll 56 and the platform rolls.

As shown in Figure 6, the hold-down roll 88 represented in outline form by the dot-dash line is offset somewhat toward the feed side of the platform rolls 90, 92 from the transverse vertical plane containing the rotative axes of such rolls, with the result that the upper roll presses the strips against the platform roll surfaces along a transverse line or narrow zone represented by the broken line z shown in the same figure. When the platform rolls are driven in the direction of the arrows, therefore, they will impart components of force to the strips respectively engaged thereby, first primarily transversely of the direction of movement of the strips and directed toward the strip edges, to urge the strips mutually together, and progressively along the path of movement of the strips, increasingly longitudinally of such path, to advance the strips in the line of feed. For this purpose the length of the hold-down roll 88 transversely of the path of movement of the strips is less than twice the radius of a platform roll, so that the ends of the hold-down rolls, spaced equally from the longitudinal center-line of the feed table, lie between parallel lines passing through the platform roll centers. Consequently no appreciable components of frictional force will be applied to the strips transversely away from the strip edges by the rotating platform rolls cooperating with hold-down roll 88 at the discharge side of a line joining the axes of rolls 90 and 92.

Adjustment of the pressure of each platform roll upwardly against its strip may be accomplished by movement of the threaded nuts 112 and 114 supporting the lower ends of the respective springs 100 and 102. Hold-down roll 88 may also be made adjustable if desired, to vary the resilient pressure exerted by it. Because the spring-urged platform rolls yield independently in reaction to variations in thickness of the strips passing over each such roll, such variations will have negligible effect upon the efficient operation of these rolls for the purpose described.

While the edge-joining operation has been described as being accomplished by the application of tape spanning the joint between the jointed edges of the veneer strips, edge-gluing apparatus could be substituted for the taping mechanism. When such apparatus is used, provision must be made for applying glue to the jointed edges of the veneer sheets at the discharge side of the jointing unit. Thermosetting apparatus, which may be of the dielectric type, can then be substituted for the tape storing and applying mechanism.

An inspection light 95 is mounted below the feed table and shines up through an opening therein to permit viewing the condition of the strip joint through the somewhat translucent bonding tape.

For convenience in maintenance and in making frequent inspections the entire upper assembly comprising the taping unit T and hold-down rolls 60 and 88 is carried by superstructure suspended from the upper framework 89 by a toggle linkage 91 as shown in Figure 2. Such mechanism may be raised and lowered at will by a hydraulic jack 93 mounted generally horizontally and suitably controlled in a conventional manner.

In application where the jointing and edge-joining units are not arranged in a continuous production line, calling for separate handling of the individual strips following jointing of their edges and prior to the edge-joining operation, it is important that the edge-jointed strips be presented accurately to the taping apparatus, whether manually or otherwise. The degree of positional accuracy should approximate that attained in the presentation of the strips to the taping mechanism obtained by the tapered guide rail 12 in the arrangement already described. In Figures 8, 9 and 10 the edge-jointed strips are first laid on a table 132 having upper supporting faces 134 and 136, one slightly above the other, respectively, and separated by a step 138 extending along the desired line of contact of the strip edges aligned with the desired direction of feed of the strips to the taping unit T. The strips laid on the table 132 are initially located with their jointed edges extending along the step 138, one strip resting on the surface 134 and the other on the surface 136.

The strips are then advanced abreast of each other to the direction of the arrows in Figure 9, from the support 132 toward the taping device T, and guided in lateral position with the aid of the edge guide 140. On one side of this guide is a strip supporting base surface 142 formed of two dihedral plane surfaces meeting along a ridge inclined both downwardly and forwardly away from a vertical guiding surface 144 adjoining the base surface. The latter surface is coplanar with the vertical plane of step 138, that is, with the desired plane of contact of the strip edges at the taping station. The feed end of the strip supporting surface ridge adjacent to the stepped support 132, is substantially flush with the upper surface 134 of the latter, so that one dihedral surface slopes gradually downward and forward from the upper surface, and the other surface slopes laterally outward from the support, to the plane of the feed table 14', as shown in Figure 9.

The lower surface 136 of support 132 is substantially coplanar with the feed table 14', so that a strip advancing to the edge guide 140 from the surface 136 to the taping apparatus requires no support other than that of the feed table surface. Such a strip receives lateral edge guidance from the vertical guide surface 146, however, which is coplanar with surface 138 on the feed side and with surface 144 which lies directly above it. It will be evident, therefore, that as the strips Sl and Sr (Figure 10) are advanced abreast of each other along the respective vertical guide surfaces 144 and 146, they emerge therefrom progressively in coplanar edge-contacting relationship.

An overhang 148 inclined upward and laterally outward from the upper edge of vertical guide surface 146, and also inclined somewhat upward opposite to the direction of feed, prevents the strip Sr from rising out of contact with surface 146 for any reason, such as natural resilience and warping. A pivoted hold-down arm 150 supported by the guide 140 rides on the strips at a location beyond the departure end of guide 140, a spring 152 establishing the hold-down pressure of the arm, as in the case of the arm 55 employed in the alternate form of Figures 2 and 6 previously described.

I claim as my invention:

1. In a strip edge-bonding apparatus, mechanism for crowding together adjacent edges of strips while moving the strips along an established line of advance toward a bonding station, said mechanism comprising: a pair of coacting strip-supporting platform rolls having the operative upper faces thereof disposed normally in a common plane and on opposite sides, respectively, of the joint line between the advancing strips; means guiding each of said rolls for rotational movement, said means comprising a pair of shafts upon each of which is mounted one of said platform rolls; said shafts extending substantially perpendicularly to the plane of said operative upper faces; driving means for positively rotating one of said platform rolls in a clockwise direction and the other of said rolls in a counter-clockwise direction as viewed from above with the strip feed side of said rolls moving toward each other; hold-down means disposed above said driven platform rolls, said hold-down means being engageable with the strips over their joint along a transverse zone offset to the strip feed side from the plane containing the platform roll axes, and operable to press marginal portions of the strips against said operative faces of said driven platform rolls, respectively; means interconnecting the platform rolls for conjoint rotation while permitting independent limited vertical movement; individual spring means urging each of the platform rolls upwardly into supporting engagement with the underside of the respective strip marginal portions moving thereover, said spring means being yieldable to enable individual downward movement of the underlying platform roll while maintained continuously in contact with the strip to accommodate variations in thickness of a strip; said interconnecting means comprising journal means rotatively mounting said shafts for rotation therein and guiding the same for sliding movement in said journal means, and mutually engaged spur gears fixed upon said shafts and operable to synchronize rotation thereof in opposite directions; and stops cooperating with said shafts and limiting endwise displacement thereof in said journal means.

2. In strip edge-bonding apparatus, mechanism for crowding together adjacent edges of strips while moving the strips along an established line of advance toward a bonding station, said mechanism comprising: a pair of coacting strip-supporting platform rolls having the operative upper faces thereof disposed normally in a common plane and on opposite sides, respectively, of the joint line between the advancing strips; means guiding each of said rolls for rotational movement, said means comprising a pair of shafts upon each of which is mounted one of said platform rolls, said shafts exxtending substantially perpendicularly to the plane of said operative upper faces; driving means for positively rotating one of said platform rolls in a clockwise direction and the other of said rolls in a counter-clockwise direction as viewed from above with the strip feed side of said rolls moving toward each other; an idling hold-down roller disposed above said driven platform rolls, engageable with the strips over their joint along a transverse zone offset to the strip feed side from the plane containing the platform roll axes, and operable to press marginal portions of the strips against said operative faces of said driven platform rolls, respectively; means interconnecting the platform rolls for conjoint rotation; guide means for permitting independent limited vertical movement of said platform rolls; individual spring means urging each of said platform rolls upwardly into supporting engagement with the underside of the respective strip marginal portions moving thereover, and yieldable to enable individual downward movement of an underlying one of said platform rolls while it is maintained continuously in contact with the strip to accommodate variations in thickness of a strip; and tape-applying mechanism located on the feed side of said idling hold-down roll and above the strips, and operable to apply tape continuously to the adjacent marginal portions of the strips over the joint to be pressed firmly against said strips by said idling hold-down roll.

References Cited in the file of this patent
UNITED STATES PATENTS

| Number | Name | Date |
|---|---|---|
| 428,147 | Seaver | May 20, 1890 |
| 1,010,846 | Black | Dec. 5, 1911 |
| 1,012,609 | Dennis | Dec. 26, 1911 |
| 1,126,292 | Runne | Jan. 26, 1915 |
| 1,853,554 | Dennis | Apr. 12, 1932 |
| 2,084,676 | Friz | June 22, 1937 |
| 2,273,653 | Melby | Feb. 17, 1942 |
| 2,371,331 | Irwin et al. | Mar. 13, 1945 |
| 2,516,280 | Welch | July 25, 1950 |